Jan. 3, 1950     G. A. LYON     2,493,003

WHEEL COVER

Filed Aug. 27, 1945

Inventor
GEORGE ALBERT LYON.

Patented Jan. 3, 1950

2,493,003

UNITED STATES PATENT OFFICE 2,493,003

WHEEL COVER

George Albert Lyon, Allenhurst, N. J.

Application August 27, 1945, Serial No. 612,845

3 Claims. (Cl. 301—37)

This invention relates to a wheel structure and more particularly to the provision of a novel retaining structure for a cover therefor.

An object of this invention is to provide improved retaining means for a wheel cover.

Another object of this invention is to provide spring clips on a wheel body part for retaining a wheel cover on the wheel and which clips are so mounted that the wheel cover can be brought into closer hugging cooperation with the body part of the wheel.

Yet another object of this invention is to provide a cover structure including a cover having a relatively deep radially outer portion and retaining means on the body part of the wheel for cooperating with this portion in such a manner that the portion may extend into tight cooperation with an indentation in the body part.

Still another object of this invention is to provide cover retaining spring clips on a wheel of such construction that they do not have to extend as far away from the wheel as heretofore in order for them to have the requisite amount of space or clearance for movement.

Still another object of this invention relates to the provision of a wheel structure wherein cover retaining spring slips are so secured thereon that the movable retaining free extremity of each clip can actually move through the wall of the wheel body part and thus not have to project as far from the wheel as has heretofore been the case.

In accordance with the features of this invention there is provided in a cover structure for a wheel a body part having a plurality of spaced apertures therethrough and a plurality of cover retaining spring clips, one being attached to the body part, adjacent each aperture and being provided with an axially rearwardly turned free extremity for retaining engagement with the cover shoulder and which extremities project into the associated aperture for movement therein in the application and removal of a cover relative to the clip.

A further feature of the invention relates to the provision of a specific cover structure especially adapted for cooperation with spring clips of the aforesaid construction and wherein the cover may be brought further into the body part of the wheel.

Figure 1:
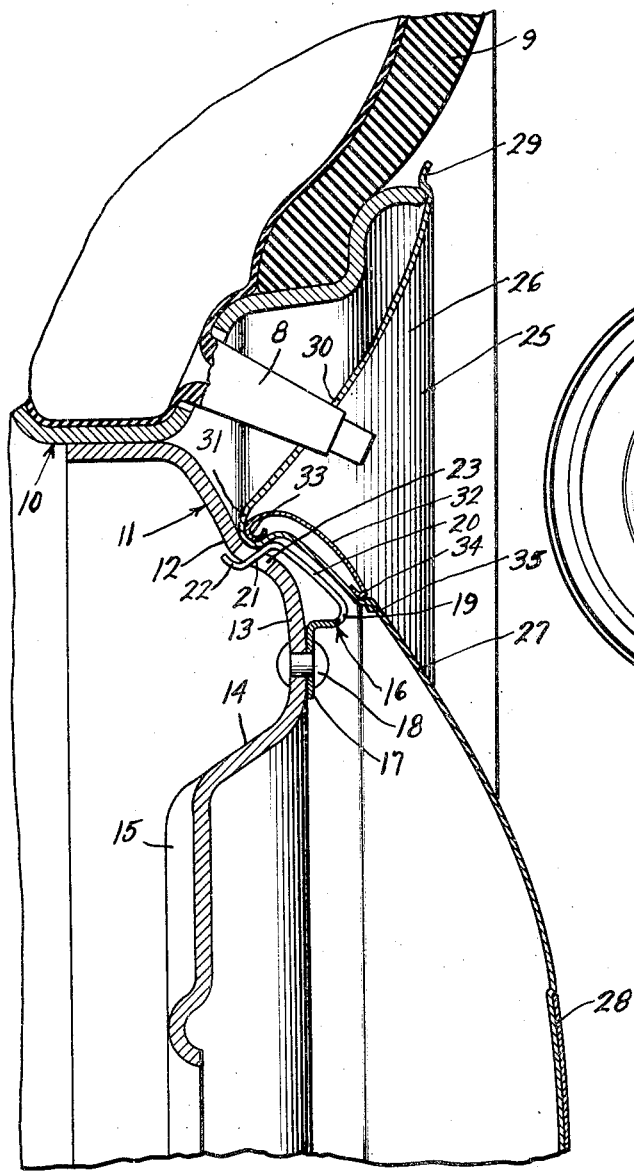
Figure 2:
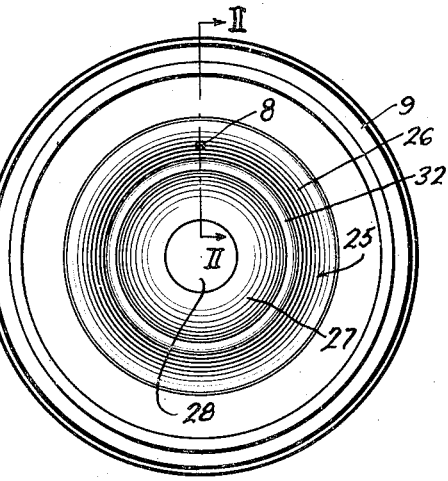

Other objects and features of this invention will more fully appear from the following detail description taken from the accompanying drawing which illustrates a single embodiment thereof and in which Figure 1 is a side view of a wheel showing my novel cover applied thereto; and Figure 2 is an enlarged fragmentary cross-sectional view taken on substantially the line II—II of Figure 1 looking in the direction indicated by the direction indicated by the arrows and showing in section one of the spring clips for retaining the cover on the wheel.

As shown on the drawing:

The reference character 9 designates generally a conventional automobile tire and pneumatic tube having the usual valve stem 8 projecting through one of the side flanges of a multi-flanged drop center type of tire rim 10. The tire rim 10 is carried the usual way upon a load bearing or body part 11 which comprises a dished metallic stamping. This body part 11 has a slight indentation at 12 in which a shoulder or turned portion of my novel cover to be hereinafter described, is adapted to seat or nest.

In addition the body part 11 has a generally radially extending portion 13 terminating in a centrally inclined or indented portion 14, which in turn terminates in a radially extending bolt-on flange 15. This flange 15, as is well known in the art, is adapted to be secured to a part on a wheel, such as a brake drum (not shown), as by means of cap screws or bolts (not shown).

Fastened to the portion 13 of the body part are a plurality of circumferentially spaced hub cap or cover retaining spring clips 16. These spring clips may be of any suitable number, such for example, as three to five, and are preferably equidistantly spaced in a common annular zone of the wheel.

Each of these clips 16 includes a base portion 17 secured in any suitable manner, as by means of a rivet 18, to the body part. In addition, each clip includes a goosenecked portion 19 having one of its legs 20 extending generally axially and radially rearwardly toward the medial plane of the wheel. This inclined leg 20 of the spring clip terminates in a bent free extremity 21 which extends through an associated aperture 23 in the body part. The extreme end of the extremity, however, is bent laterally as at 22, so as to limit the outward displacement of the free end of the clip relative to the body part.

By this arrangement, I am enabled to provide clearance for the movement of the free extremity of the clip without having to provide that clearance beyond the plane or outer surface of the body part. This enables the clip to more closely hug the contour of the body part which is highly desirable in the shipping of wheels. That is to say, the further out the spring clips project from the body part, the more apt they are to become damaged or broken in shipment.

The turned free ends 21 of all of the clips are arranged in a generally common circle which is of such diameter that the clips must yield when a hub cap or a cover is pressed home into retaining cooperation with the spring clips.

I shall now proceed to describe in detail my novel wheel cover 25, which is particularly adapted for cooperation with the new form of spring clips 16. This cover 25 includes radially outer and inner divergent cover portions 26 and 27 which are concentrically connected together by a turned intermediate juncture portion 31. The turned portion 31 is of generally S-shape in cross section formed with a generally radially outwardly bowed annular portion at the radially inner side of the cover juncture. This bowed portion affords an overhang whereby to provide a generally radially inwardly indented groove at the cover juncture which defines at the axially inner side of the cover an annular shoulder facing generally axially outwardly and adapted to be cammed over and into retaining cooperation with the free end 21 of the spring clips.

This cover 25 may be made of any suitable material although I contemplate excellent results may be obtained by making it out of sheet metal. It is also possible to make it out of synthetic plastic material such, for example, as ethyl cellulose, cellulose acetate, or a vinyl resin. When it is made from such plastic material, it will be found that while the cover is resiliently deflectable, it can be deflected without permanent deformation since after deflection, it will resume its original contour.

In the event the cover is made of metal, as illustrated, the central portion 27 may be provided with a slight indentation at its center in which is fastened an ornamental disc 28. This disc may comprise an indicia plate on which the name or emblem of the automobile may appear.

The outer cover portion 26 has its outer edge slightly turned at 29 so as to overhang an outer edge of the rim part 10 in close proximity to the tire 9. This cover portion 26 extends generally radially and axially rearwardly from the turned edge 29 to the turned portion 31 of the cover which is seated in the indentation 12 of the body part. The depth and curvature of the portion 26 is such that in use it appears to constitute a continuation of the side wall of the tire. This effect can be augmented by giving the portion 26 an external white finish in which event it will appear to constitute a white side wall part of the tire in which the tire extends clear down to the body part.

I propose to reinforce the turned or intermediate portion of the cover by an annular metal bead 32, which is particularly desirable if the cover is made of plastic material. The reason for this is that this bead is so constructed and so cooperates with the turned portion 31 that it reinforces the part of the cover which is subjected to pressure when it is pressed home into retaining cooperation with the spring clips 16.

The hollow bead 32 may be made of any suitable sheet material although I preferably contemplate rolling it from stainless steel strip. It includes an outer turned edge 33 of such diameter that the same tightly nests in retaining cooperation with the generally axially inwardly facing shoulder provided by the turned portion 31 of the cover 25 at the axially inner side of the cover. The inner edge 34 of this bead may likewise be turned and is held against being stressed out of place from its clip-opposing relation to the cover juncture 31 and for this purpose is so proportioned and so located as to seat against a shoulder 35 formed in an indented groove in the central portion 27 of the cover spaced radially inwardly from the radial bulge of the turned portion 31.

By reason of the fact that the free extremities 21 of the spring clips 16 are brought into closer cooperation with the wall of the body part 11, I am enabled to bring the cover portion 26 further into the body part. This relationship is further augmented by the indentation 12 in the body part. Thus the cover is enabled to have a relatively deep outer annular portion 26 which greatly augments the massive appearance of the tire.

In the event that the cover 25 is made of metallic material, it may be easily removed from the wheel by inserting a pry-off tool under the turned edge 29 and forcibly prying the cover off the spring clips 16. When it is desired to apply the cover to the wheel, it is placed over the side of the wheel with the opening 30 aligned with the valve stem 8 and is then pressed axially home against the free extremities of the spring clips which give as the turned portion 31 is cammed over and into retaining cooperation with the free extremities 21. The free extremities 21 serve to forcibly wedge the turned portion 31 of the cover against the indented portion 12 of the body part.

On the other hand, if the cover 25 is made of a plastic material, its removal may be effected by the operator manually gripping the outer edge 26 and pulling on the same until the cover is free from the clip. As noted before, a plastic material is preferably of such character that even though the cover is deflected in its use, the deflection will not result in permanent deformation of the cover.

I claim as my invention:

1. In a wheel structure including a tire rim and body part, said body part having a plurality of cover-retaining spring clips thereon including generally radially outwardly and axially inwardly facing engagement cam surfaces disposed close to the outer surface of the wheel body radially inwardly spaced from but adjacent to the tire rim and body part juncture, a cover member formed from relatively thin resiliently pliable sheet material comprising circular radially inner and outer divergently related portions the outer of which is cross-sectionally dimensioned to lie in concealing relation to the tire rim and generally simulates a radially inward extension of a tire wall and the inner of which is disposed in concealing relation to the wheel body part and said spring clips, the junction of said cover portions providing an axially inwardly facing shoulder at the axially outer side of the cover and a generally axially outwardly facing shoulder at the axially inner side of the cover, and a reinforcing bead of substantially more rigid material than said cover member engaging and stiffening said outer shoulder, said inner side shoulder being engaged in snap-on, pry-off relation by said cam surfaces on the clips and holding that portion of the cover junction axially inwardly from said shoulder in abutment with the wheel body, the cover member having means thereon spaced from said outer side shoulder thereof to hold the bead against being stressed out of place from such shoulder.

2. A wheel structure including a tire rim and body part, said body part having a plurality of cover-retaining spring clips thereon including generally radially outwardly and axially inwardly facing engagement cam surfaces disposed close to the outer surface of the wheel body radially inwardly spaced from but adjacent to the tire rim and body part juncture, a cover member formed from relatively thin material comprising circular radially inner and outer divergently related portions the outer of which is cross-sectionally dimensioned to lie in concealing relation to the tire rim and the inner of which is disposed in concealing relation to the wheel body part and said spring clips, the junction of said cover portions providing at the axially outer side of the cover an axially inwardly facing shoulder and of the axially inner side of the cover a generally axially outwardly facing shoulder, and a reinforcing bead of substantially more rigid material than said cover member engaging and stiffening said outer shoulder, said inner shoulder being engaged in snap-on, pry-off relation by said cam surfaces on the clips and holding that portion of the cover junction axially inwardly from said shoulder in abutment with the wheel body, said radially inner cover portion having an inwardly depressed groove spaced radially inwardly from said shoulders and said bead having its inner edge nested within said groove.

3. In a cover structure of the character described, a cover member of relatively thin, resiliently pliable material including an outer annular cover member and an inner circular cover member integrally joined together and divergently related, said inner cover member having a generally radially outwardly bowed annular portion closely adjacent to the junction of the cover portions whereby to provide a generally radially inwardly indented groove at the junction of the cover portions, and also having an indented groove spaced radially inwardly from said bowed portion, and a reinforcing bead of substantially more rigid material than the cover member having a bowed cross-section and a width to fit over said bowed portion of the inner cover member, the radially outer edge of said bead being nested in said junction groove and the radially inner edge of said bead being nested in said radially inwardly spaced groove, the radially outer edge of said bead having an underturned portion backing up the axially inner side of said annular bulge whereby to adapt the inner shoulder afforded by said axially inner side of the bulge to engage with snap-on, pry-off retaining means on a wheel structure.

GEORGE ALBERT LYON.

REFERENCES CITED

The following references are of record in the file of this patent:

UNITED STATES PATENTS

| Number | Name | Date |
|---|---|---|
| Re. 22,120 | Lyon | June 16, 1942 |
| 2,196,718 | Ash | Apr. 9, 1940 |
| 2,421,385 | Lyon | June 3, 1947 |
| 2,421,386 | Lyon | June 3, 1947 |